United States Patent
Hollaender et al.

(10) Patent No.: US 11,804,643 B2
(45) Date of Patent: Oct. 31, 2023

(54) RADAR SENSOR COMPRISING A DISTRIBUTOR PLATE HAVING A WAVEGUIDE STRUCTURE THEREIN, WHERE PINS COUPLE A CIRCUIT BOARD TO THE WAVEGUIDE STRUCTURE

(71) Applicant: Robert Bosch GmbH, Stuttgart (DE)

(72) Inventors: Christian Hollaender, Waldbronn (DE); Gustav Klett, Moessingen (DE); Klaus Baur, Mietingen (DE); Klaus Voigtlaender, Wangen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/557,767

(22) Filed: Dec. 21, 2021

(65) Prior Publication Data
US 2022/0223991 A1 Jul. 14, 2022

(30) Foreign Application Priority Data
Jan. 12, 2021 (DE) .................... 10 2021 200 196.3

(51) Int. Cl.
| | |
|---|---|
| *H01P 5/103* | (2006.01) |
| *H01P 5/08* | (2006.01) |
| *G01S 13/88* | (2006.01) |
| *H01P 3/08* | (2006.01) |
| *H01P 5/107* | (2006.01) |

(52) U.S. Cl.
CPC ............ *H01P 5/103* (2013.01); *G01S 13/88* (2013.01); *H01P 3/08* (2013.01); *H01P 5/08* (2013.01); *H01P 5/107* (2013.01)

(58) Field of Classification Search
CPC .................................. H01P 5/103; H01P 5/107
USPC ............................................. 333/26
See application file for complete search history.

(56) References Cited

U.S. PATENT DOCUMENTS

| | | | | |
|---|---|---|---|---|
| 4,608,713 | A | * 8/1986 | Shiomi et al. | H01Q 1/247 455/328 |
| 4,623,848 | A | * 11/1986 | Saka et al. | H03F 3/60 330/277 |
| 2020/0266516 | A1 | * 8/2020 | Uemichi | H01P 3/121 |

FOREIGN PATENT DOCUMENTS

| | | |
|---|---|---|
| DE | 19636892 C1 | 10/1997 |
| DE | 19636893 C1 | 1/1998 |
| DE | 19636890 C1 | 2/1998 |

* cited by examiner

*Primary Examiner* — Benny T Lee
(74) *Attorney, Agent, or Firm* — NORTON ROSE FULBRIGHT US LLP; Gerard Messina

(57) ABSTRACT

A radar sensor that includes a circuit board, a waveguide structure having at least one waveguide channel, and at least one pin that is pressed into the circuit board. The pin connects the circuit board to the at least one waveguide channel of the waveguide structure in such a way that radar signals may be coupled into the at least one waveguide channel and/or decoupled from the at least one waveguide channel.

8 Claims, 3 Drawing Sheets

RADAR SENSOR COMPRISING A DISTRIBUTOR PLATE HAVING A WAVEGUIDE STRUCTURE THEREIN, WHERE PINS COUPLE A CIRCUIT BOARD TO THE WAVEGUIDE STRUCTURE

CROSS REFERENCE

The present application claims the benefit under 35 U.S.C. § 119 of German Patent Application No. DE 102021200196.3 filed on Jan. 12, 2021, which is expressly incorporated herein by reference in its entirety.

FIELD

The present invention relates to a radar sensor, in which pins are used for a transition between a circuit board and a waveguide, as well as a method for the manufacture thereof.

BACKGROUND INFORMATION

In radar sensors, waveguide antennas are often used that are intended to be connected to a circuit board. It is conventional to contact waveguide channels using a plug and to couple the radar signals via a coupling lug.

Furthermore, transitions between a microstrip line and a waveguide, in which each of the waveguides has a bridge in the transition area that starts from a waveguide wall opposite the strip line and is in contact with the strip line, are described in German Patent Nos. DE 196 36 890 C1, DE 196 36 892 C1, and DE 196 36 893 C1.

SUMMARY OF THE INVENTION

In accordance with an example embodiment of the present invention, a radar sensor is provided that includes a circuit board and a waveguide structure. The circuit board includes conductor tracks, in particular in the form of strip lines. Other high frequency conducting systems, such as microstrips, coplanar waveguides (CPW), grounded CPWs, or others may, however, also be used. The waveguide structure may be preferably made of metal-plated plastic. In the waveguide structure, at least one waveguide channel is designed. The waveguide channel may in principle have any shape, in particular one with a rectangular cross section.

In accordance with an example embodiment of the present invention, at least one pin, which essentially protrudes perpendicularly to the surface of the circuit board, is pressed into the circuit board. A single pin insertion method (SPI), which is generally conventional and which is particularly cost-effective, is preferably used to press in the pin. The at least one pin is contacted via at least one of the conductor tracks of the circuit board. The position and shape of the at least one pin are advantageously adapted in advance to the design of the waveguide structure. Here, the position of every pin corresponds to the position of a corresponding waveguide channel of the waveguide structure. In addition, every pin has a shape that is adapted to the shape of the waveguide channel. To determine the position and the shape of the at least one pin, a three-dimensional field simulation may be carried out. Alternatively or additionally, empirical data may be used with the aid of tests. When the waveguide structure and the circuit board are brought together, each pin extends into the corresponding waveguide channel. The at least one pin connects the circuit board with the at least one corresponding waveguide channel of the waveguide structure in such a way that radar signals from the circuit board may be coupled into the at least one waveguide channel. Bronze alloys having a corresponding coating for the purpose of protection against corrosion are suitable in terms of material, for example. Due to the high frequency of the radar signals (76 GHz to 81 GHz), the signal transportation only takes place in the edge layer, i.e., in the coating of the pins (skin effect). The coating is preferably made of a material having a high conductivity, such as for example a silver coating over a nickel core.

Such pins are simple and cost-effective to manufacture. In this way, the costs for the manufacture of the radar sensor may be reduced as compared to other methods. Moreover, already existing concepts and designs may be transferred to the radar sensor according to the present invention.

In accordance with an example embodiment of the present invention, at least one waveguide antenna is provided that has a desired directional characteristic and is placed accordingly. The waveguide antenna is connected to the at least one waveguide channel. The at least one waveguide channel receives the radar signal via the at least one pin and transmits the radar signal to the at least one waveguide antenna, from where the radar signal is emitted. In addition, the waveguide channel forwards a radar signal, which is received by the at least one waveguide antenna, via the at least one pin to the circuit board. The output of the at least one waveguide channel may be essentially situated in all directions freely on the waveguide structure, preferably, however, on the surface of the waveguide structure that is opposite the circuit board. Such an embodiment is preferably used in a patch array antenna.

Optionally, at least one waveguide antenna may be formed in the waveguide structure and may be directly connected to the at least one waveguide channel. In this way, a one-piece waveguide structure is formed that receives the radar signals from the circuit board, forwards them to the at least one waveguide antenna, and emits the radar signals via the at least one waveguide antenna at a desired directional characteristic. The same applies to receiving the radar signal.

Furthermore, a method is provided for manufacturing a radar sensor. A circuit board and a waveguide structure are provided as described above. In the waveguide structure, at least one waveguide channel is designed according to the concept established in advance. Subsequently, at least one pin is pressed into the circuit board. A single pin insertion method (SPI), which is generally conventional, may be preferably used to press in the pin. The position and shape of the pin are adapted to the at least one waveguide channel. Finally, the waveguide structure and the circuit board are brought together. The at least one pin connects the circuit board with the at least one waveguide channel.

This method provides a cost-effective manufacture of radar sensors. For a precise description and for the advantages thus achieved as well as for further preferred embodiments, reference is made to the above-mentioned description with regard to the radar sensor.

The at least one pin is preferably pressed into the circuit board perpendicularly to same. The waveguide structure may thus be easily set onto the circuit board in a straight manner when these are brought together.

BRIEF DESCRIPTION OF THE DRAWINGS

Exemplary embodiments of the present invention are illustrated in the figures and explained in greater detail in the description below.

DETAILED DESCRIPTION OF EXAMPLE EMBODIMENTS

Figure 1:
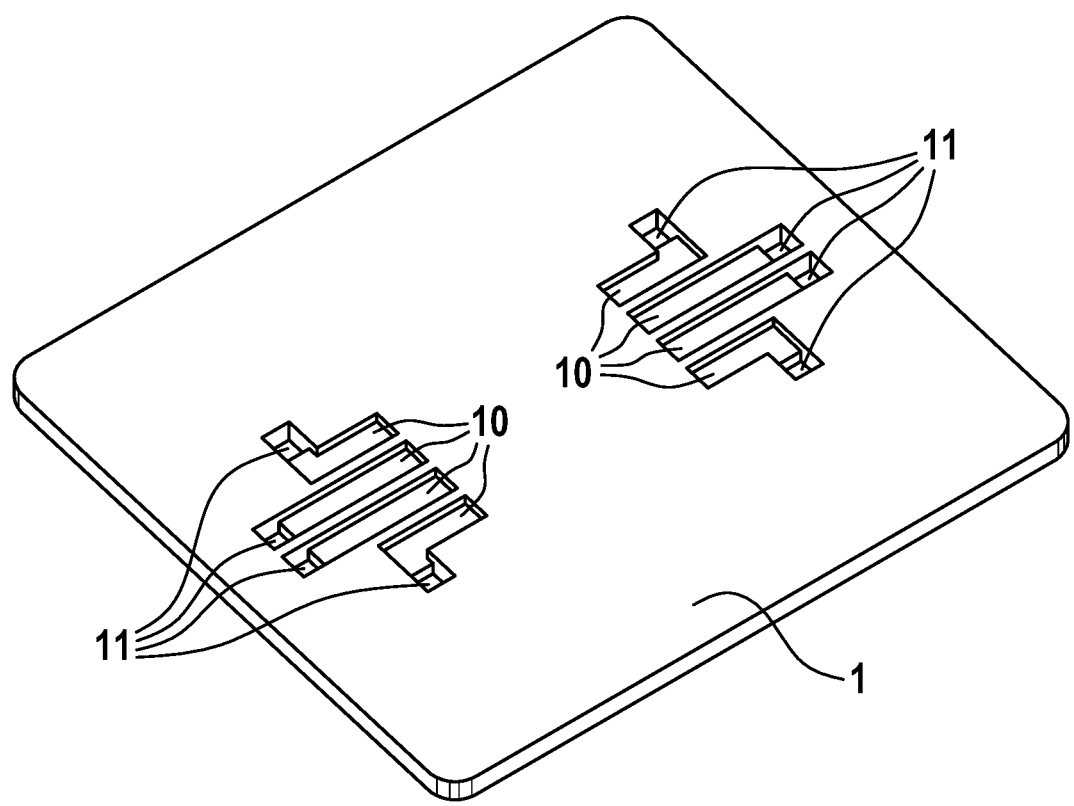
FIG. 1 shows an isometric view of a waveguide structure of a radar sensor according to an example embodiment of the present invention.

FIG. 1 shows an isometric view of a waveguide structure in the form of a distributor plate 1. In distributor plate 1, waveguide channels 10 are designed that are used to guide a radar signal. Distributor plate 1 is made of metal-plated plastic. Waveguide channels 10 have metal-plated side walls. In this exemplary embodiment, two groups made of four waveguide channels 10 each, i.e., eight waveguide channels 10 overall, are formed. The number, the position, the orientation, and the shape of the waveguide channels may vary and be adapted to the usage conditions. In this exemplary embodiment, waveguide channels 10 have the same cross section. Waveguide channels 10 are open on one side and have an opening 11 on the other side.

Figure 2:
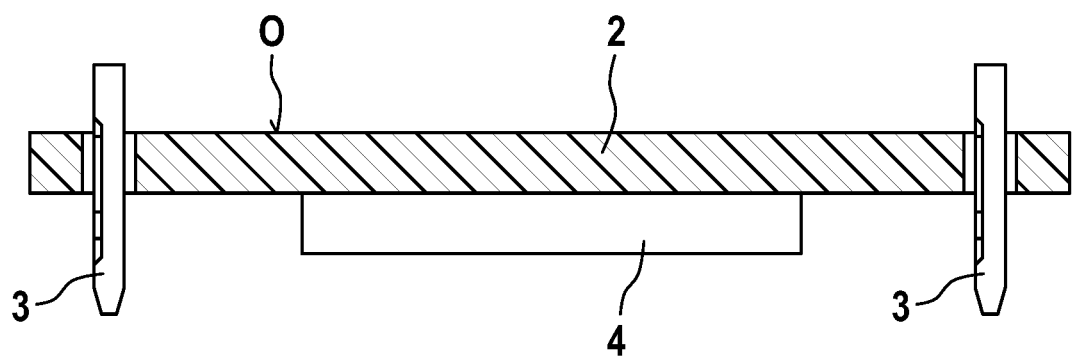
FIG. 2 shows a sectional view of a circuit board of a radar sensor according to an example embodiment of the present invention.
Figure 3:
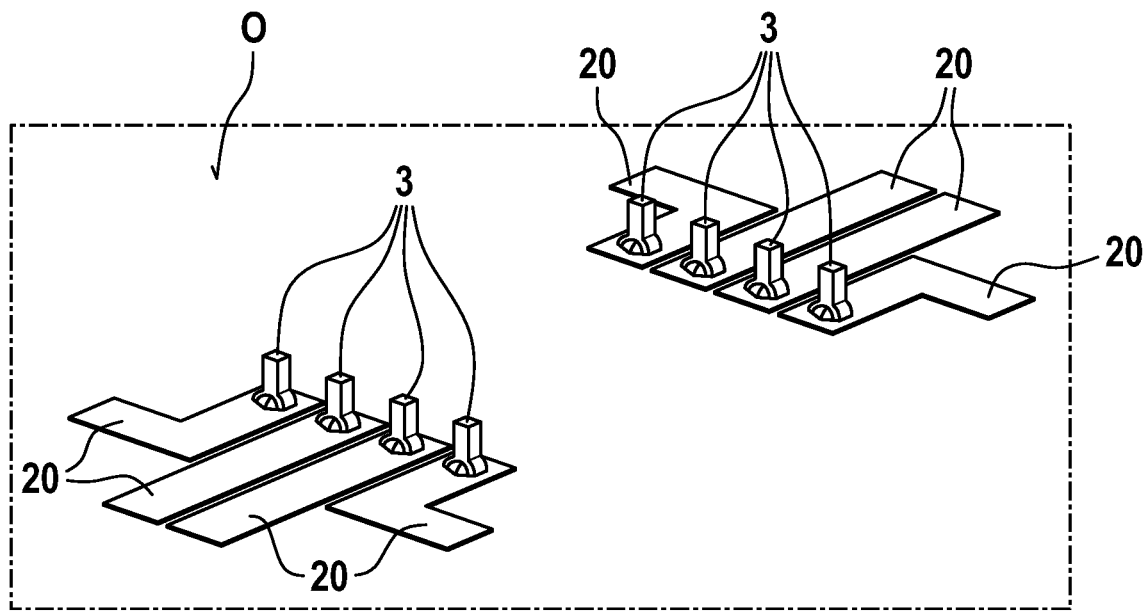
FIG. 3 shows a view of a surface of the circuit board, in accordance with an example embodiment of the present invention.

FIG. 2 shows a sectional view of a circuit board 2, and FIG. 3 shows a view of a surface O of circuit board 2. In FIG. 3, circuit board 2 has strip lines 20 on surface O. Multiple pins 3 are pressed into circuit board 2 (FIG. 2), only two of which are visible in FIG. 2. A single pin insertion method is used to press in pins 3. Pins 3 stand perpendicularly to surface O of circuit board 2 and protrude from surface O. Optionally, pins 3 that protrude too far from surface O are shortened. Every pin 3 is contacted via a separate strip line 20 in FIG. 3. Furthermore, in FIGS. 2 and 4, a transceiver 4 is situated as an integrated circuit (IC) on a side opposite surface O (FIG. 3) on circuit board 2. Transceiver 4 (FIGS. 2 and 4) is configured to provide a radar signal that is intended to be emitted and to process a radar signal that is received. Transceiver 4 (FIGS. 2 and 4) is connected to strip lines 20 (FIG. 3), for example with the aid of a through-connection (not illustrated).

Figure 4:
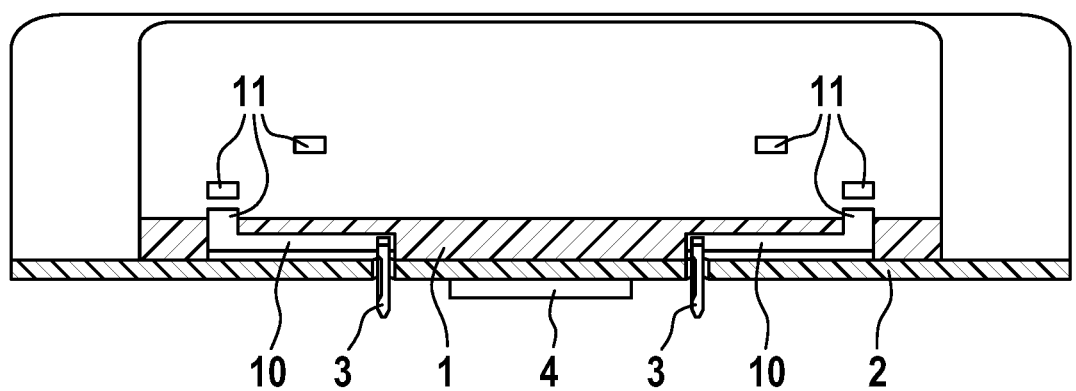
FIG. 4 shows an isometric sectional view through a radar sensor according to one specific example embodiment of the present invention.

To manufacture the radar sensor, distributor plate 1 is brought together with circuit board 2 in FIG. 4. Distributor plate 1 is plugged onto circuit board 2 with the downward open side of waveguide channels 10, i.e., the side illustrated in FIG. 1. Pins 3 have a position and a shape that is adapted to waveguide channels 10 in each case. To determine the position and the shape of waveguide channels 10 and pins 3, a three-dimensional field simulation may be used, for example. In this exemplary embodiment, pins 3 have the same shape and size and waveguide channels 10 have the same cross section, namely a square cross section. Every pin 3 has a head that has a square cross section and a side length that matches the transverse length of waveguide channels 10 in each case. The position of pins 3 is selected in such a way that they engage with a point of contact of hollow wavelength channels 10 in each case, when distributor plate 1 and circuit board 2 are brought together. Since pins 3 are oriented perpendicularly to surface O, distributor plate 1 is put on circuit board 2 in a direction perpendicular to surface O, along an imagined straight line. Finally, distributor plate 1 and circuit board 2 are connected to one another.

Figure 5:
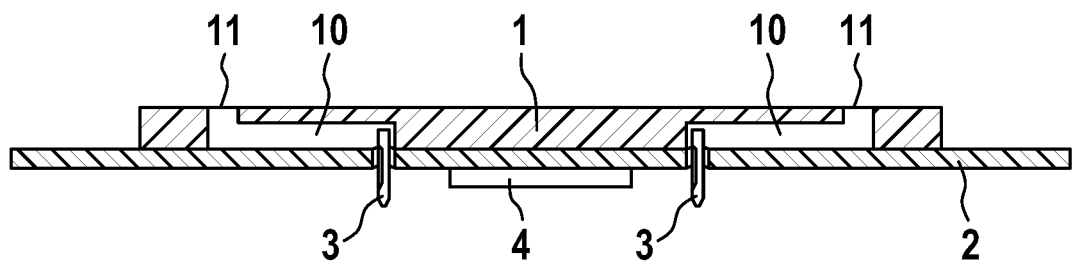
FIG. 5 shows a sectional view through the radar sensor according to an example embodiment of the present invention.
Figure 6:
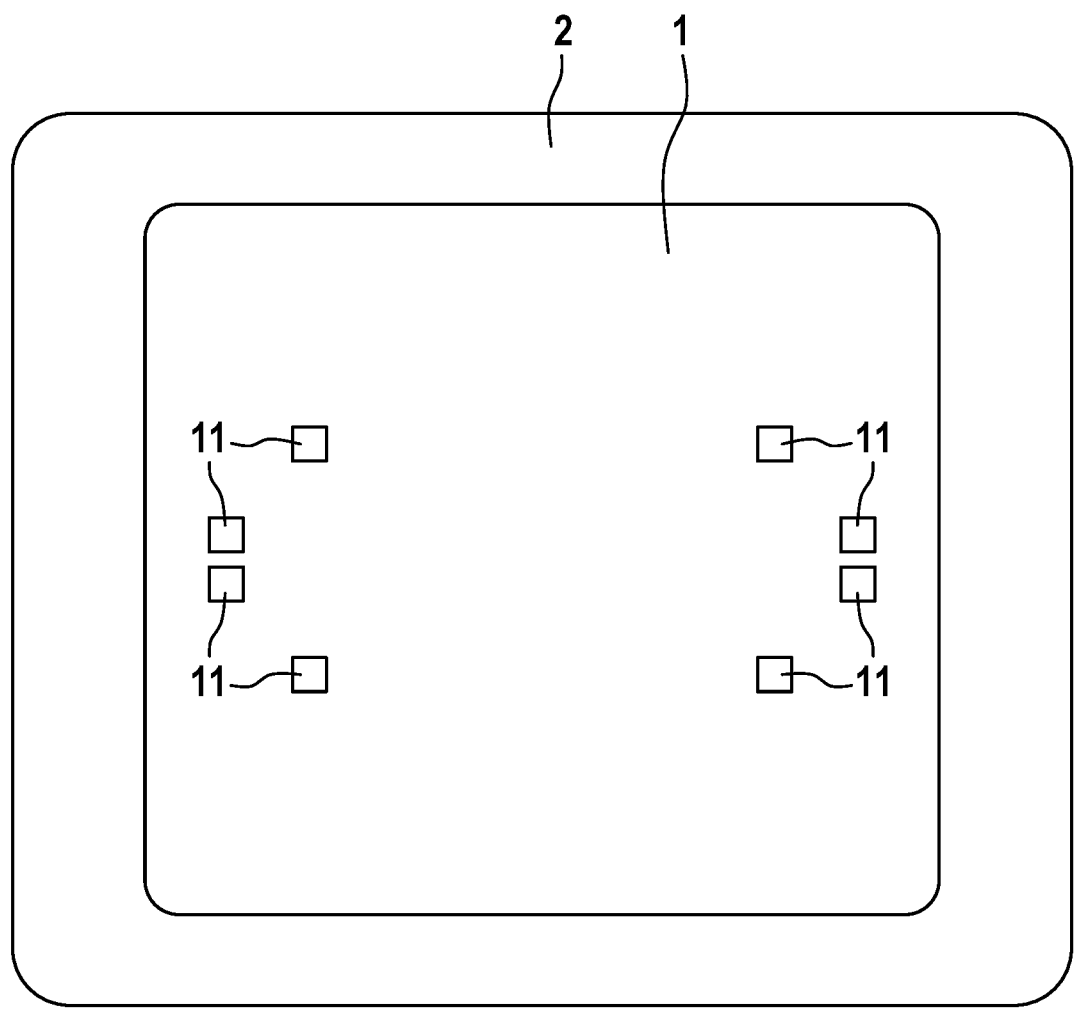
FIG. 6 shows a top view of the radar sensor according to an example embodiment of the present invention.

FIG. 4 shows a sectional isometric view through a radar sensor according to one specific embodiment of the present invention. FIG. 5 shows a view of the section from FIG. 4. FIG. 6 shows a top view of the radar sensor. Distributor plate 1 is connected to circuit board 2. A pin 3 (in FIGS. 4 and 5) protruding from surface O (FIG. 3) of circuit board 2 in each case extends in a waveguide channel 10 (in FIGS. 4 and 5) formed in distributor plate 1. Each waveguide channel 10 is thus connected to circuit board 2. Waveguide channels 10 (in FIGS. 4 and 5) have openings 11 (in FIGS. 4 and 5) on the top side of distributor plate 1 (in FIGS. 4 and 5), which is opposite circuit board 2. Eight openings 11 (in FIG. 6) are provided in this exemplary embodiment (see FIG. 6). The number and position of openings 11 (in FIGS. 4 and 5) may vary and be adapted to the usage conditions. Further openings, which are not shown here, may also be designed at the other sides of circuit board 2. Waveguide antennas, which are not shown here, are couple-able and/or connectable into openings 11 of distributor plate 1. The waveguide antennas may also be directly designed in distributor plate 1 at openings 11. A radar signal is generated by transceiver 4, guided via strip line 20 (in FIG. 3) in circuit board 2 to corresponding pin 3, coupled via pin 3 in waveguide channel 10 (in FIGS. 4 and 5) of distributor plate 1 and supplied through waveguide channel 10 (and through opening 11) (in FIGS. 4 and 5) to the waveguide antenna, where, at the desired directional characteristic, the radar signal is finally emitted. A radar signal reflected from an external object is received by the waveguide antenna, guided through waveguide channel 10 (in FIGS. 4 and 5) of distributor plate 1 to pin 3, decoupled via pin 3 from waveguide channel 10 (in FIGS. 4 and 5), supplied to strip line 20 (in FIG. 3) of circuit board 2 and guided via strip line 20 (in FIG. 3) to transceiver 4. The emitted and received radar signals may use the same paths and pins 3 depending on the usage conditions or use separate paths and pins 3 in each case.

What is claimed is:

1. A radar sensor, comprising:
   a circuit board;
   a waveguide structure having a plurality of waveguide channels; and
   a plurality of pins, each of the pins is pressed into the circuit board and which connects the circuit board with the plurality of waveguide channels of the waveguide structure so that radar signals are coupled via the pins into the plurality of waveguide channels;
   wherein the waveguide structure includes a distributor plate having the plurality of waveguide channels,
   wherein the distributor plate is made of a metal-plated plastic, and wherein each of the plurality of waveguide channels has metal-plated side walls,
   wherein each of the plurality of waveguide channels is respectively open on one side and has a corresponding opening on another side, and
   wherein the circuit board has strip lines on a surface of the circuit board.

2. The radar sensor as recited in claim 1, wherein a position and a shape of each of the plurality of pins is adapted to the corresponding at least one waveguide channel.

3. The radar sensor as recited in claim 1, wherein at least one waveguide antenna is respectively connectable to the at least one waveguide channel.

4. The radar sensor as recited in claim 1, wherein the each of the plurality of pins is pressed into the circuit board perpendicularly to the circuit board, so that each of the plurality of pins stand perpendicularly to the surface of the circuit board and protrude from the surface.

5. A method for manufacturing a radar sensor, the method comprising:
   providing a circuit board;
   providing a waveguide structure;
   forming a plurality of waveguide channels in the waveguide structure;
   pressing a plurality of pins, each of the pins is pressed into the circuit board, wherein the pins have positions and shapes that are adapted to the plurality of waveguide channels; and
   bringing together the waveguide structure and the circuit board, so that the plurality of pins connects the circuit board with the plurality of waveguide channels;
   wherein the waveguide structure includes a distributor plate having the plurality of waveguide channels,
   wherein the distributor plate is made of a metal-plated plastic, and wherein each of the plurality of waveguide channels has metal-plated side walls,
   wherein each of the plurality of waveguide channels is respectively open on one side and has a corresponding opening on another side, and
   wherein the circuit board has strip lines on a surface of the circuit board.

6. The method as recited in claim 5, wherein each of the plurality of pins is pressed into the circuit board perpendicularly to the circuit board, so that each of the plurality of pins stand perpendicularly to the surface of the circuit board and protrude from the surface.

7. The method as recited in claim 5, wherein a position and a shape of each of the plurality of pins is adapted to the corresponding at least one waveguide channel.

8. The method as recited in claim 5, wherein at least one waveguide antenna is respectively connectable to the at least one waveguide channel.

* * * * *